(12) United States Patent
Hanten

(10) Patent No.: US 7,059,102 B2
(45) Date of Patent: Jun. 13, 2006

(54) METHOD FOR PRODUCING A CASING

(75) Inventor: Jürgen Hanten, Bad Nauheim (DE)

(73) Assignee: Poly-Clip System GmbH & Co. KG, Frankfurt am Main (DE)

( * ) Notice: Subject to any disclaimer, the term of this patent is extended or adjusted under 35 U.S.C. 154(b) by 192 days.

(21) Appl. No.: 10/433,312

(22) PCT Filed: Oct. 1, 2002

(86) PCT No.: PCT/EP02/10976
§ 371 (c)(1),
(2), (4) Date: Nov. 27, 2003

(87) PCT Pub. No.: WO03/030647
PCT Pub. Date: Apr. 17, 2003

(65) Prior Publication Data
US 2005/0044816 A1 Mar. 3, 2005

(30) Foreign Application Priority Data
Oct. 8, 2001 (DE) .......................... 101 49 457

(51) Int. Cl.
*B65B 9/10* (2006.01)

(52) U.S. Cl. ............................. 53/450; 53/451; 53/514; 53/516; 53/558; 53/545

(58) Field of Classification Search ........... 53/450–452, 53/514, 516, 517, 558, 545
See application file for complete search history.

(56) References Cited

U.S. PATENT DOCUMENTS

| 4,410,011 | A |   | 10/1983 | Andrä et al. ............... 138/118.1 |
| 4,528,225 | A |   | 7/1985  | Hutschenreuter et al. ..... 428/36 |
| 4,563,231 | A | * | 1/1986  | Porrmann et al. ............ 156/90 |
| 4,563,792 | A |   | 1/1986  | Niedecker .................. 17/33 |
| 4,940,614 | A |   | 7/1990  | Kastl et al. ................. 428/348 |
| 5,832,698 | A | * | 11/1998 | Huguenin ..................... 53/451 |
| 5,976,649 | A | * | 11/1999 | Kuethe et al. ............. 428/35.6 |

FOREIGN PATENT DOCUMENTS

| DE | 19618172    | 11/1997 |
| EP | 0105558     | 11/1986 |
| EP | 0177992     | 12/1988 |
| GB | 2 126 191 A | 3/1984  |
| RU | 287537      | 11/1971 |

\* cited by examiner

*Primary Examiner*—Louis K. Huynh
*Assistant Examiner*—Hermant M. Desai
(74) *Attorney, Agent, or Firm*—Norris McLaughlin & Marcus PA

(57) ABSTRACT

In a process for the manufacture of packs, for a product in portions, with a paste-like product that is to be packaged, especially sausages, in a foil tube (15), starting from a band-shaped flat foil (1), which has been provided unilaterally with a connecting layer, this flat foil is unwound from a stock supply (2) and bent in the longitudinal direction to form the tube in such a way that the connecting layer is located on the outside, and the longitudinal sides (10) of the longitudinal edges (9) are located opposite one another, after which a strip (12), which is capable of forming a connection or which is provided with a connecting layer, is placed in the longitudinal direction over both longitudinal edges (9) and is connected to them, after which the foil tube (15), which is formed in this way, is then filled directly with the product that is to be packaged.

3 Claims, 2 Drawing Sheets

METHOD FOR PRODUCING A CASING

This is a 371 of PCT/EP02/10976 filed 01 Oct. 2002 (international filing date).

The invention pertains to a process for the manufacture of packs, for a product in portions, with a paste-like product that is to be packaged, especially sausages, in a foil tube, starting from a band-shaped flat foil, which has been provided unilaterally with a connecting layer, whereby this flat foil is unwound from a stock supply and is bent in the non longitudinal direction to form the tube in such a way that the connecting layer is located on the outside, and the longitudinal sides of the longitudinal edges are located opposite one another, after which a strip, which is capable of forming a connection or which is provided with a connecting layer, is placed in the longitudinal direction over both longitudinal edges and is connected to them, and the foil tube, which is formed in this way, is then filled immediately thereafter with the product that is to be packaged.

BACKGROUND OF THE INVENTION

It is known from U.S. Pat. No. 4,528,225 that the foil tube can be manufactured by unwinding a band-shaped flat foil, which has been provided unilaterally with a connecting layer, from a stock supply, and bending it in the longitudinal direction to form the tube in such a way that the connecting layer is located on the outside, and the longitudinal sides of the longitudinal edges are located opposite one another, after which a strip, which is capable of forming a connection or which is provided with a connecting layer, is placed in the longitudinal direction over both longitudinal edges and is connected to them. The completed tube is then rolled up and used at a subsequent point in time and at another location for the manufacture of packs for a product in portions.

The connection of the longitudinal edges of the foil band by means of a connecting strip permits the use of a foil, which has been provided only unilaterally with a connecting layer, and thereby solves a problem that arises during the process, which is known from EP-B-105 558 and EP-B-177 993, namely that longitudinal edges are connected to one another in a mutually overlapping manner by means of hot sealing. This is because the foil must be bilaterally sealable in order to ensure an air-tight and liquid-impermeable sealing seam because the outer surface comes into contact with the inner surface when overlapping the foil's edges.

In such cases, use is therefore made of triple layer foils comprising a middle supporting foil and bilateral sealing layers. Such foils are not only expensive in terms of manufacture, but they also have the additional disadvantage that the raw sausage composition, which is introduced into the foil tube during sausage manufacture, does not adhere adequately to the sealing layer, so that the product, which is to be packaged, becomes detached during the cooking process and bubbles are formed that become filled with fatty or gelatin material from the raw sausage composition. This is unwelcome for optical reasons. Thus the foil's surface, which faces the product that is to be packaged, is treated mechanically or chemically in order to increase the adhesion of the raw sausage composition. Thus it is provided according to DE 196 18 172 A1, for example, that the (subsequent) inner surface of the tubular packaging casing be treated by a corona in order to ensure the adhesion of the raw sausage composition to the inner surface of the foil tube. However, this all requires additional expense.

On the other hand, no treatments of the foil tube's inner surface are possible in the case of its manufacture according to U.S. Pat. No. 4,528,225 that was outlined previously, whereby such treatments would exert mechanical or taste-related effects on the product that is to be packaged, i.e., a raw sausage composition in particular, and whereby the effects exerted thereon would improve, for example, the adhesion of the raw sausage composition or release flavoring materials to the product that is to be packaged. This is because such treatments, which usually take place in the form of the application of coatings, are destroyed by rolling up the completed foil tube and have in addition a non-permanent existence.

SUMMARY OF THE INVENTION

In contrast to this, the foil tube according to the invention, which is formed from a flat foil, which is provided only unilaterally with a connecting layer, and a connecting strip, is then directly filled with the product that is to be packaged. In this way, use can also be made of a treated foil—e.g. a coated foil—of the former type, and it is also possible to correct the foil tube's dimension during the filling process, so that manufacturing variations in the foil's breadth or in its mechanical properties can be balanced without delay.

DETAILED DESCRIPTION

The connecting strip, which is used for connecting the foil tube's two longitudinal sides that are held ready for abutment, can be unwound from a separate stock supply. However, a preferred further development of the invention provides for its separation from an edge of the band-shaped flat foil and redirecting it in such a way that its connecting layer comes to lie on the outside of the foil that is bent to form the tube. This can advantageously take place when unwinding the band-shaped flat foil.

The plastic foil preferably consists of a material with a surface to which the raw sausage composition adheres without requiring any additional treatment of the surface. This material can be e.g. polyamide, though PVC and PVDC are also suitable, along with mixed foils (blends), or foils comprising an ionomeric plastic such as Surlyn®.

BRIEF DESCRIPTION OF THE DRAWINGS

The invention will be illustrated below via examples of designs on the basis of the drawings. The following aspects are shown therein.

Figures 1, 2:
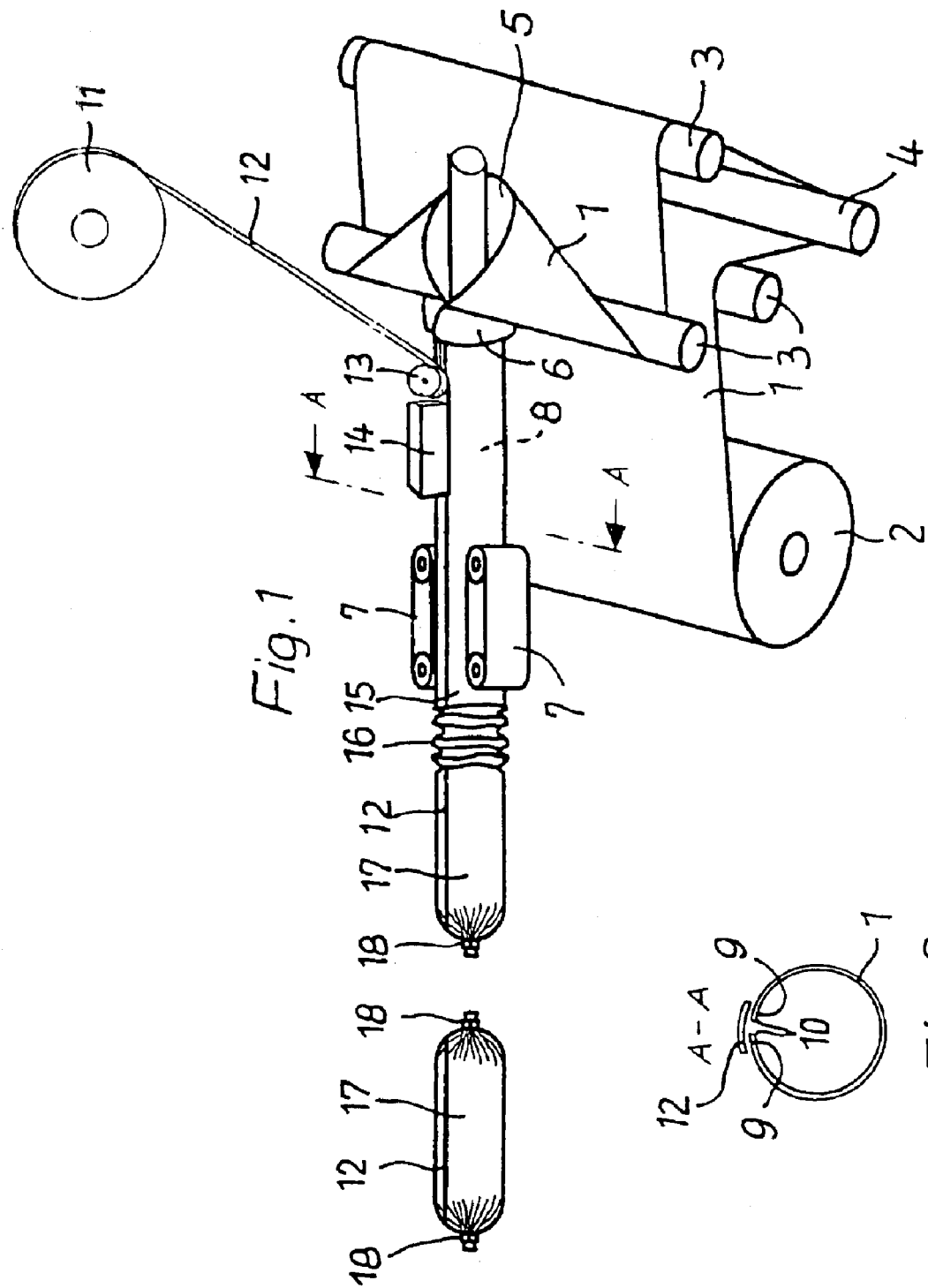
FIG. 1 shows a device that is suitable for carrying out the process in a schematic perspective view.
FIG. 2 shows a cross-section through the foil tube, which is produced in this way, according to the line A—A in FIG. 1.

A band-shaped flat foil 1, which has already been provided unilaterally with a sealing layer, is unwound from a stock supply 2 in roll form, and drawn via deflecting rollers 3 and a dancing roller 4 over a forming shoulder 5, and through a forming collar 6, and along a guide pipe 8 by means of parallel transportation belts 7, whereby the guide pipe is covered by the foil 1 that is bent to form the tube. In conjunction with the forming collar 6, the forming shoulder 5 allows the two longitudinal sides 10 of the longitudinal edges 9 of the foil 1 to be located opposite one another ("in abutment") on the guide pipe 8, which is not illustrated in FIG. 2, whereby the sealing layer of foil 1 is located on the outside.

A foil strip 12 is unwound from a stock supply roll 11 by means of a roller 13 that places the strip 12 onto the longitudinal edges 9 of the foil 1 in a bridging manner in the way that can be seen from FIG. 2. The strip 12 consists of a sealable material that likewise comprises e.g. a supporting foil with a sealing layer that faces the longitudinal edges 9 of the foil 1. A sealing bar 14 connects the strip 12 firmly to the two longitudinal edges 9 of the foil 1, and thereby manufactures the foil tube 15 that arrives continuously—e.g. in lengths of 2000 m—in a filling station, which is not illustrated, via a storage station 16 that gathers it, whereby the packs 17 for a product in portions, e.g. sausages, are manufactured in this filling station by introducing the product, which is to be packaged, into the foil tube 15, constricting it and sealing it (clips 18).

Figure 3:
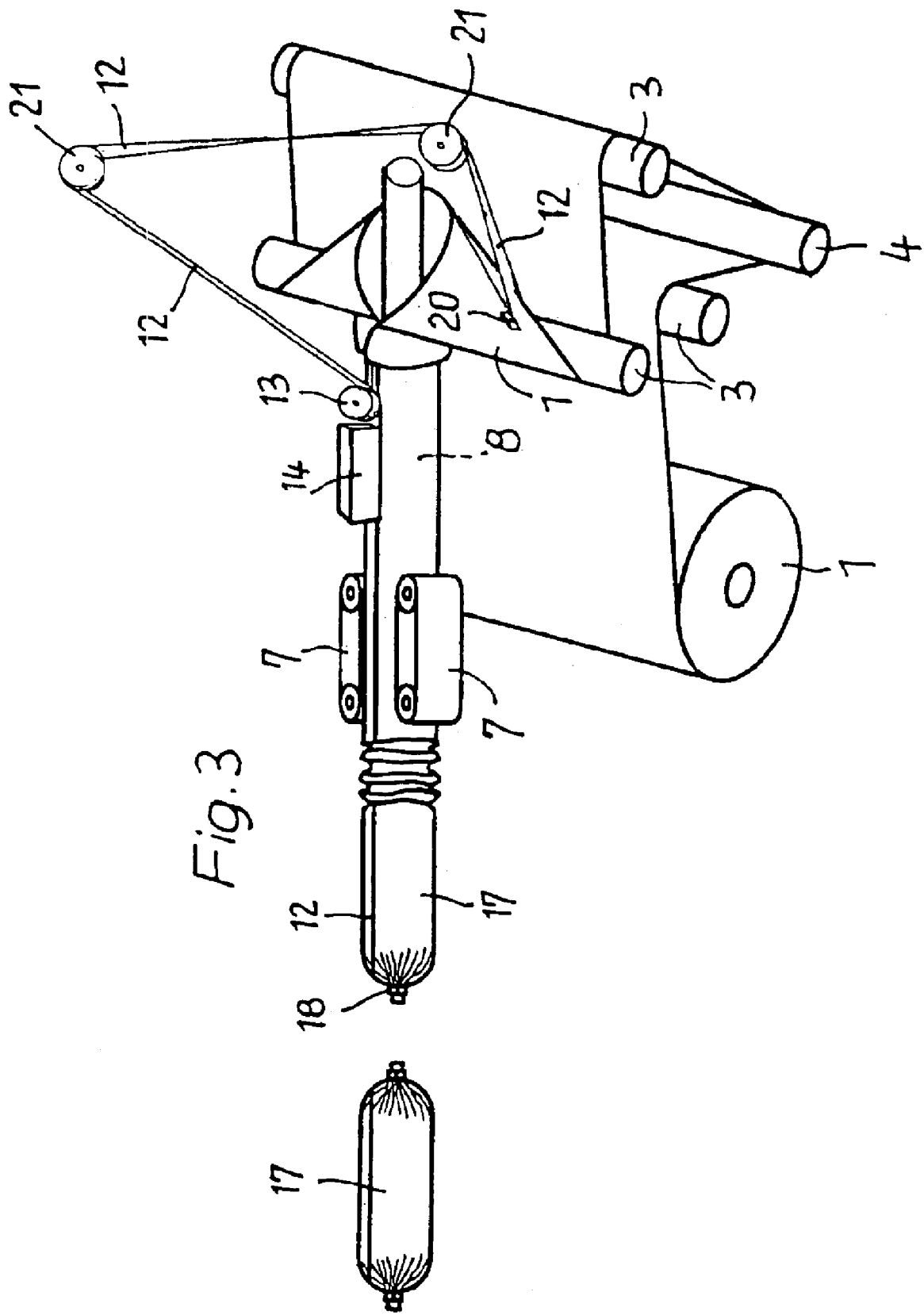
FIG. 3 shows a form of design of the device, which corresponds to FIG. 1 but which has been modified to carry out a modified process.

The foil tube 15, which is manufactured according to FIG. 3, does not differ from the foil tube that is manufactured according to FIG. 1 and that is illustrated in a cross-section in FIG. 2; however, the strip 12 is not unwound from a separate stock supply but, rather, it is separated from the foil 1 at an edge thereof with the help of a knife 20, and is conveyed onward via deflecting rollers 21 together with rotation of the roller 13. In this way, the length of the strip 12 that is available always corresponds to the length of the foil 1 that is available, and a separate provision and supply of the manufacturing device with these two components of the foil tube 15 is not required.

What is claimed is:

1. Process for manufacturing packs for packaging a pastry product in portions, in a foil tube comprising the steps of:
    providing a band-shaped flat foil having longitudinal sides of longitudinal edges, and said flat foil comprising a sealing layer on one side, whereby said flat foil is unwound from a stock supply, and
    forming a strip by severing a strip of material from a longitudinal edge of said band shaped flat foil, and
    bending the remainder of said flat foil in the longitudinal direction to form the tube with the sealing layer on the outside, and the longitudinal sides of the longitudinal edges located opposite one another, and
    placing the strip upside down on the outside surface of the tube in the longitudinal direction over both the longitudinal edges, and
    sealing said strip to the longitudinal edges to form a connection with the outside surface of the tube, and
    filling the foil tube (15) directly with the product that is to be packaged.

2. Process according to claim 1, wherein the flat foil (1) consists of a material with a surface to which a raw sausage composition can adhere.

3. Process according to claim 1, wherein said strip (12) is severed from said band-shaped flat foil (1) while said band-shaped flat foil is being unwound.

* * * * *